June 17, 1941.  S. W. E. ANDERSSON  2,245,637
REFRIGERATION
Filed March 30, 1937
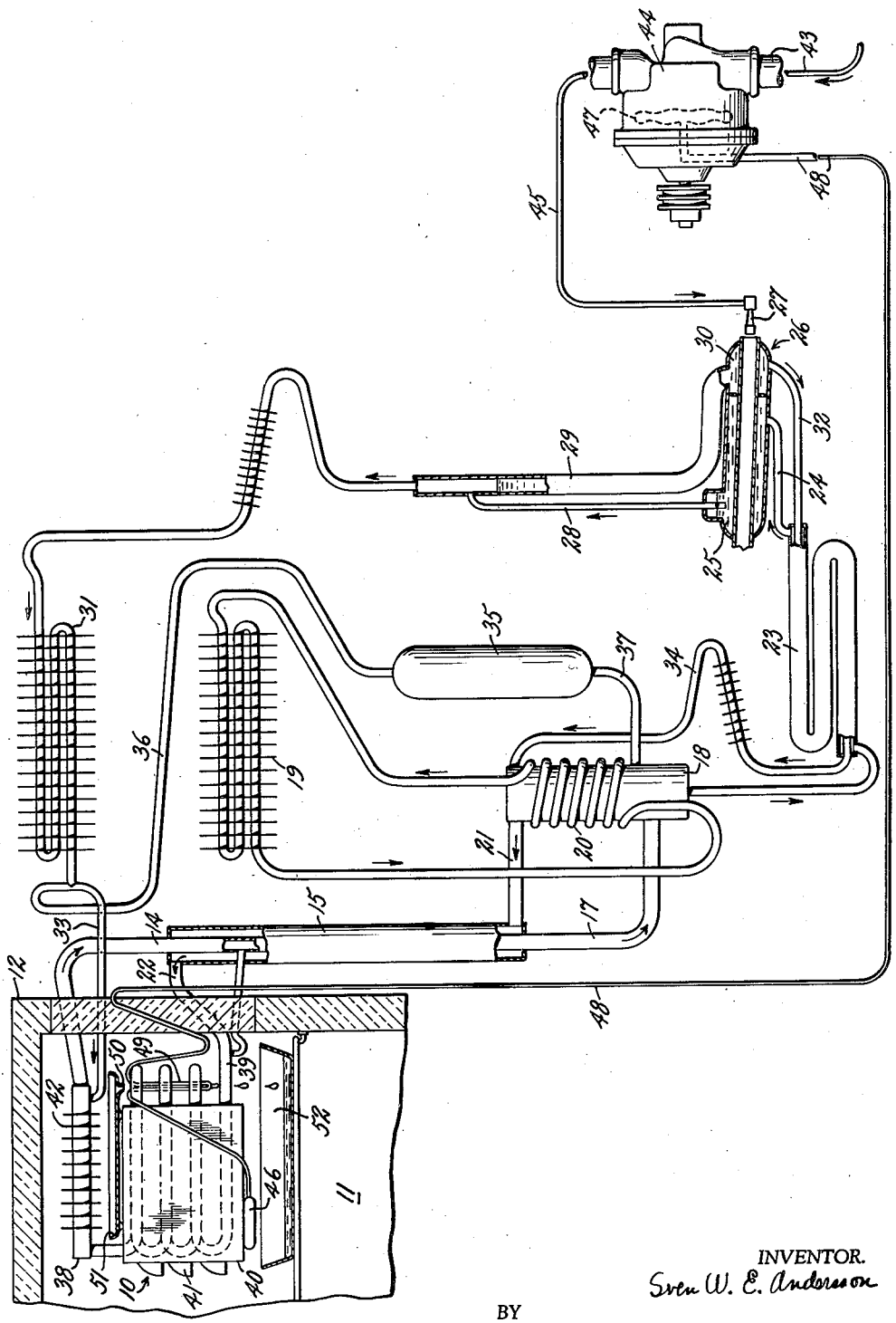
INVENTOR.
Sven W. E. Andersson
BY
Ea Fenander
his ATTORNEY.

Patented June 17, 1941

2,245,637

UNITED STATES PATENT OFFICE 2,245,637

REFRIGERATION

Sven W. E. Andersson, Evansville, Ind., assignor to Servel, Inc., New York, N. Y., a corporation of Delaware Application March 30, 1937, Serial No. 133,780

10 Claims. (Cl. 62—5)

My invention relates to refrigeration and has for its object to provide an improvement in thermostatic control of refrigeration apparatus having a plural temperature cooling element or evaporator, as will appear from the following description and accompanying drawing in which the figure diagrammatically shows a refrigeration system embodying the invention.

The refrigeration system shown is of a uniform pressure absorption type, generally as described in Patent No. 2,037,782 to William R. Hainsworth, in which an auxiliary pressure equalizing gas is employed. It is to be understood, however, that the invention can be employed with other types of refrigeration systems.

The system includes a cooling element or evaporator 10 disposed in an enclosed space 11 which may form a food storage compartment of a thermally insulated refrigerator cabinet 12. The refrigerant fluid, such as ammonia, evaporates in the evaporator 10 and diffuses into an inert gas, such as hydrogen, to produce a refrigerating effect. The resulting gaseous mixture of ammonia and hydrogen flows from evaporator 10 through conduit 14, gas heat exchanger 15, and conduit 17 into an absorber 18. A vaporization-condensation circuit containing a suitable volatile heat transfer fluid and including a condenser 19 and a cooling coil 20 is provided to cool absorber 18.

In absorber 18 the ammonia vapor is absorbed out of the rich gas by a suitable liquid absorbent, such as water. The inert hydrogen gas is returned to evaporator 10 through conduit 21, the gas heat exchanger 15, and conduit 22; and the enriched absorption liquid is conducted through a liquid heat exchanger 23 and conduit 24 into chamber 25 of generator 26.

By heating generator 26, as by a gas burner 27, liquid is raised by vapor-liquid lift action through conduit 28 into the upper part of a standpipe 29. The liberated ammonia vapor entering stand-pipe 29 from conduit 28, as well as the ammonia vapor expelled from solution in standpipe 29 and chamber 30, is liquefied in an air-cooled condenser 31. The liquefied ammonia flows from condenser 31 through conduit 33 to the evaporator 10 to complete the refrigerating cycle. The weakened absorption liquid from which refrigerant has been expelled is conducted from generator 26 through conduit 32 liquid heat exchanger 23, and conduit 34 into the upper part of absorber 18.

A vessel 35 is connected by conduit 36 to the lower part of condenser 31 and by conduit 37 to the gas circuit, as at the absorber 18, for example, so that any hydrogen which may pass into the condenser can flow into the gas circuit. Ammonia vapor not liquefied in condenser 31 flows through conduit 36 to displace hydrogen in vessel 35 and force such hydrogen through conduit 37 into the gas circuit, thereby raising the total pressure in the system so that an adequate condensing pressure is obtained to insure condensation of ammonia vapor in condenser 31.

The cooling element 10 comprises an upper section 38 and a lower section including a looped coil 39. The coil 39 may be embedded in or otherwise suitably arranged in heat exchange relation with a shell 40 providing a freezing compartment for receiving trays 41 for freezing water and the like. The shell 40 presents a limited surface for heat transfer thereto from air in the storage compartment 11. The upper section 38 is arranged with a plurality of cooling fins 42 whereby a relatively extensive surface is provided for cooling air in the storage compartment 11.

Liquid ammonia entering the upper section 38 of the evaporator through conduit 33 flows downward in counter-flow to inert hydrogen gas which flows upward from conduit 22. The gas in the upper section 38, therefore, contains a greater amount of ammonia vapor than the gas in the lower section of the evaporator 10. The partial vapor pressure of ammonia in the gas mixture formed in the evaporator is a gradient so that the evaporating temperature of liquid ammonia in the evaporator is also a gradient, the evaporating temperature of liquid ammonia being higher in the upper section or air cooling portion 38 of the evaporator.

A suitable combustible gas is delivered from a source of supply through conduit 43, valve 44, and conduit 45 to burner 27. An expansible fluid thermostat is arranged to control valve 44 and regulate the flow of gas to burner 27. The expansible fluid thermostat contains a suitable volatile fluid and comprises a bulb 46 secured to and in thermal contact with the bottom of shell 40 of evaporator 10, an expansible diaphragm 47 which is located within the casing of valve 44, and a conduit 48 connecting the bulb 46 and diaphragm 47.

The thermostatic control device which controls valve 44 is fully described and claimed in my application Serial No. 758,195, filed December 19, 1934, now Patent No. 2,123,921, and has not been fully shown in the drawing since a detailed illustration thereof is not necessary for an understanding of the present invention. The expansible fluid thermostat, which is responsive to a temperature condition affected by evaporator 10, is normally arranged to control valve 44 and maintain evaporator 10 at a desired low temperature. When reference is made to my above co-pending application, it will be readily understood that the normal control of valve 44 may be modified to reduce the flow of gas to the burner, whereby the temperature of evaporator 10 rises above the freezing temperature and frost that has accumulated on evaporator 10 is permitted to melt. This modified operation or defrosting period is automatically terminated and normal control of valve 44 is resumed upon a predetermined abnormal expansion of the expansible diaphragm 47 due to evaporation of volatile liquid in bulb 46 when the temperature of the evaporator has risen above the freezing temperature.

During normal control of valve 44 the diaphragm 47 operates responsive to the temperature of bulb 46. Thus, when the bulb 46 tends to fall below a desired low temperature the quantity of volatile fluid in the thermostat system that condenses into liquid phase in bulb 46 increases, whereby the diphragm 47 contracts. With contraction of diphragm 47 valve 44 closes so that the flow of gas to burner 27 is reduced and the refrigerating effect produced by evaporator 10 is also reduced. Conversely, when the thermal bulb 46 tends to rise above the desired low temperature the quantity of liquid volatile fluid in the bulb decreases due to evaporation thereof, whereby the diphragm 47 expands. With expansion of diaphragm 47 valve 44 opens so that the flow of gas to burner 27 is increased and the refrigerating effect produced by evaporator 10 is also increased.

When the normal control of valve 44 is modified to instigate a defrosting period due to accumulation of frost on evaporator 10, all of the frost in contact with bulb 46 may melt while frost still remains on another portion of the evaporator. Even though the coldest part of a plural temperature evaporator may vary under different operating conditions, it is desirable for the thermostat to operate at all times responsive to the coldest region or part of the evaporator. I accomplish this by causing water resulting from melting of frost to flow in thermal relation with a portion of the expansible fluid thermostat. The water which is caused to flow in thermal relation with a portion of the thermostat is preferably conducted thereto from a region of the evaporator where the frost tends to remain the longest during defrosting.

In the drawing I have shown one manner of carrying out the invention by providing conduit 48 with a downward extending loop 49 which may be in thermal contact with coil 39 of the evaporator. The two sides of loop 49 are closely adjacent to each other, and the upper ends thereof are located below an opening 50 in a tray 51 which is supported in any suitable manner below the upper section 38 of the evaporator. During a defrosting period water resulting from melting of frost on the upper section 38 is collected in tray 51. The cool water drips through opening 50 and flows downward over the surface of loop 49 of conduit 48. From the lower end of loop 49 the water collects in a tray 52 which is located beneath the lower section of evaporator 10.

When the normal control of valve 44 is modified to reduce the flow of gas to burner 27 so that evaporator 10 will rise above the freezing temperature to melt frost thereon, the temperature of bulb 46 rises and evaporation of liquid volatile fluid therein will take place. During such defrosting the bulb 46 may rise above the freezing temperature before frost has melted from an upper part of the evaporator which is at a lower temperature than the part in thermal contact with bulb 46.

By providing loop 49 and flowing melted frost over the surface thereof, this portion of the thermostat system may be maintained at a lower temperature than bulb 46 when the above conditions occur, so that volatile fluid condenses into liquid phase in the loop 49. In order to keep liquid volatile fluid in loop 49 when it is at a lower temperature than bulb 46 the loop is preferably of sufficient internal diameter to prevent the liquid from being raised therein by vapor bubbles into other parts of the thermostat system which are at a higher temperature.

If liquid volatile fluid formed in loop 49 during defrosting should be permitted to flow into warmer parts of the thermostat system, the liquid will vaporize in such other parts and it will again be necessary to condense the vaporized fluid into liquid phase in loop 49 to reduce the pressure of the thermostat. Since the rate at which this cool drip water is made available is relatively small, conduit 48 is provided with the loop 49 to trap liquid volatile fluid formed in this part of the thermostat system.

When the upper section 38 of the evaporator is substantially defrosted, cool water from tray 51 no longer flows over the surface of loop 49 of conduit 48. When this occurs the liquid volatile fluid in loop 49 will vaporize whereby the pressure in the thermostat will increase and automatically terminate the defrosting period. When the defrosting period is terminated, normal operation is again resumed and control of the thermostatic operation of valve 44 is shifted to bulb 46 which is at a lower temperature than loop 49 due to the refrigerating effect produced by evaporator 10 with which the bulb 46 is in thermal contact.

While I have shown and described a single embodiment of the invention, it will be apparent to those skilled in the art that various modifications and changes may be made without departing from the spirit and scope of the invention. Instead of utilizing cool water resulting from melting of frost on the upper section 38 of evaporator 10, for example, cool drip water resulting from frost melting on any other region of the evaporator may be employed to cool any desired portion of the thermostat. It is therefore contemplated to cover all modifications and changes which come within the spirit of the invention, as pointed out in the following claims.

What is claimed is:

1. Refrigeration apparatus including a generator, a condenser, an absorber, an evaporator, a heater for said generator, a device for controlling said heater, an expansible fluid thermostat having a part in contact with said evaporator for operating said device, and means for causing water resulting from frost melting on said evaporator to flow in contact with another part of said thermostat capable of controlling the pressure in said thermostat.

2. Refrigeration apparatus including a generator, a condenser, an absorber, an evaporator, a heater for said generator, a device for controlling said heater, an expansible fluid thermostat for operating said control device and having a first part thereof in contact with said evaporator, said thermostat including a conduit having a loop portion, and means for causing water resulting from frost melting on said evaporator to flow in contact with said loop portion.

3. An absorption refrigeration system including an evaporator constructed and arranged for flow of inert gas therethrough and downward flow of liquid in the presence of the gas, members including a generator and condenser for supplying liquid refrigerant to the upper part of said evaporator, a heater for said generator, a device for controlling said heater, an expansible fluid thermostat having a part in contact with a first region of said evaporator for operating said control device, and means for causing water resulting from frost melting on a region of said evaporator higher than said first region to flow in contact with another part of said thermostat capable of controlling the pressure in said thermostat when it is at a lower temperature than said first part.

4. In a method of refrigeration with the aid of a system having a cooling element subject to formation of frost thereon, initiating a high temperature period to cause melting of frost on said cooling element, collecting into one stream substantially all water resulting from melting of frost on at least the upper part of said cooling element, and terminating said period upon cessation of said stream so that all of the frost formed on the upper part of said cooling element is melted before termination of said high temperature period.

5. In a method of refrigeration with the aid of a cooling element having parts at different elevations and subject to formation of frost thereon, the steps of initiating a frost melting period, collecting into a single stream substantially all water resulting from melting of frost on one part of said cooling element, the cessation of said stream due to elimination of frost on said one part constituting a first condition resulting from initiating of said frost melting period and increase in temperature of said other part due to elimination of frost thereon constituting a second condition resulting from initiating of said frost melting period, and terminating said frost melting period responsive to one of said conditions which said one condition is the last to occur.

6. In a method of refrigeration with the aid of a system having a cooling element subject to formation of frost thereon, initiating a frost melting period, collecting into a single stream substantially all water resulting from melting of frost on a part of said cooling element where frost tends to remain longest during said period, and terminating said frost melting period upon cessation of said stream so that all of the frost on said cooling element is melted before termination of said frost melting period.

7. In a refrigeration system having a cooling element subject to formation of frost thereon, means to initiate a frost melting period, means to collect and form into a single stream substantially all water resulting from frost melting on at least the upper part of said cooling element, and means for terminating said period upon cessation of said stream so that all of the frost formed on the upper part of said cooling element is melted before termination of the frost melting period.

8. In a refrigeration system having a cooling element subject to formation of frost thereon and having parts at different elevations, means for initiating a frost melting period, means to collect and form into a single stream water resulting from melting of frost on one part of said cooling element, the cessation of said stream due to elimination of frost on said one part constituting a first condition resulting from initiation of said frost melting period and increase in temperature of said other part due to elimination of frost thereon constituting a second condition resulting from initiation of said frost melting period, and means to terminate said frost melting period responsive to one of said conditions which said one condition is the last to occur, so that all of the frost on said cooling element is melted before termination of said frost melting period.

9. In a refrigeration system having a cooling element subject to formation of frost thereon, means for initiating a frost melting period, means to collect and form into a single stream substantially all water resulting from melting of frost on a part of said cooling element where frost tends to remain the longest during said period, and means for terminating said period upon cessation of said stream to insure melting of all of the frost on said cooling element before the termination of said frost melting period.

10. In a refrigeration system having a cooling element subject to formation of frost thereon and having parts at different elevations, means for initiating a frost melting period, means to collect and form into a single stream water resulting from melting of frost on one part of said cooling element, and means to terminate said period responsive to the last to occur between cessation of said stream and increase in temperature of another part of said cooling element upon removal of frost therefrom so that all of the frost on said cooling element is melted before the termination of said frost melting period, said means to terminate said period including a volatile fluid thermostat system having two portions each capable of holding all of the fluid in the system in liquid phase, one of said portions being arranged so that it will be in thermal contact with said stream, and the other of said portions being in thermal exchange relation with said other part of said cooling element.

SVEN W. E. ANDERSSON.